(12) United States Patent
Kim et al.

(10) Patent No.: US 10,311,625 B2
(45) Date of Patent: Jun. 4, 2019

(54) IMAGE DISPLAYING APPARATUS, IMAGE GENERATING APPARATUS, IMAGE PROVIDING SERVER, IMAGE DISPLAYING METHOD, IMAGE GENERATING METHOD, AND COMPUTER PROGRAMS FOR EXECUTING THE IMAGE DISPLAYING METHOD AND THE IMAGE GENERATING METHOD

(71) Applicant: NAVER CORPORATION, Seongnam-si (KR)

(72) Inventors: Hyo Kim, Seongnam-si (KR); Hyun Chul Lee, Seongnam-si (KR); Ji Han Kim, Seongnam-si (KR); Byoung Kwan Kim, Seongnam-si (KR)

(73) Assignee: NAVER Corporation, Seongnam-si (KR)

( * ) Notice: Subject to any disclaimer, the term of this patent is extended or adjusted under 35 U.S.C. 154(b) by 0 days.

(21) Appl. No.: 15/441,858

(22) Filed: Feb. 24, 2017

(65) Prior Publication Data
US 2017/0243564 A1    Aug. 24, 2017

(30) Foreign Application Priority Data
Feb. 24, 2016    (KR) .................. 10-2016-0022026

(51) Int. Cl.
G09G 5/14    (2006.01)
G06T 13/80    (2011.01)
(52) U.S. Cl.
CPC .............. *G06T 13/80* (2013.01); *G09G 5/14* (2013.01)

(58) Field of Classification Search
CPC ................................................... G06F 3/0485
See application file for complete search history.

(56) References Cited

U.S. PATENT DOCUMENTS

2003/0043174 A1*   3/2003  Hinckley ............ G06F 3/03547
                                             345/684
2006/0279633 A1*  12/2006  Oka ........................ G06T 7/001
                                             348/187

(Continued)

FOREIGN PATENT DOCUMENTS

JP     2010-049406 A     3/2010
JP     5861248 B1        1/2016
KR     10-2014-0040875 A  4/2014

OTHER PUBLICATIONS

Office Action issued in corresponding Korean Patent Application No. 10-2016-0022026, dated Mar. 7, 2017.

*Primary Examiner* — Jitesh Patel
(74) *Attorney, Agent, or Firm* — Greer Burns & Crain, Ltd.

(57) ABSTRACT

Provided is an image displaying apparatus including: a receiver configured to receive a first image group including an initial image and a final image; a display configured to display, on an image display window, one of a plurality of images included in the first image group; and a controller configured to control the display to display, on the image display window, the initial image, and control the display to change an image displayed on the image display window from the initial image to the final image, based on at least one of a degree to which the image display window is scrolled on the display and an elapsed time from when the initial image is displayed on the image display window.

16 Claims, 13 Drawing Sheets

(56) References Cited

U.S. PATENT DOCUMENTS

| | | | |
|---|---|---|---|
| 2009/0144661 A1* | 6/2009 | Nakajima | G06F 3/048 715/835 |
| 2010/0125786 A1* | 5/2010 | Ozawa | G06F 3/04845 715/702 |
| 2012/0005623 A1* | 1/2012 | Ishak | G06F 3/0485 715/786 |
| 2012/0030625 A1* | 2/2012 | Miyazaki | G06F 3/0488 715/830 |
| 2014/0204225 A1* | 7/2014 | Takimoto | H04N 5/23222 348/207.1 |
| 2014/0240364 A1* | 8/2014 | Ishikawa | G09G 5/34 345/684 |
| 2015/0088664 A1* | 3/2015 | Sano | G06F 17/30864 705/14.69 |
| 2015/0121255 A1* | 4/2015 | Lee | G06Q 10/10 715/758 |
| 2015/0169151 A1* | 6/2015 | Urakawa | G06F 3/0485 715/776 |
| 2015/0169161 A1* | 6/2015 | Moon | G06F 3/0485 715/785 |
| 2015/0261418 A1* | 9/2015 | Heo | G06F 3/04842 345/661 |
| 2015/0264205 A1* | 9/2015 | Isamikawa | H04N 1/00477 358/1.15 |
| 2015/0339006 A1* | 11/2015 | Chaland | G06F 3/0482 715/835 |
| 2016/0117092 A1* | 4/2016 | Wang | G06F 3/0482 715/786 |
| 2017/0038931 A1 | 2/2017 | Murase | |

* cited by examiner

IMAGE DISPLAYING APPARATUS, IMAGE GENERATING APPARATUS, IMAGE PROVIDING SERVER, IMAGE DISPLAYING METHOD, IMAGE GENERATING METHOD, AND COMPUTER PROGRAMS FOR EXECUTING THE IMAGE DISPLAYING METHOD AND THE IMAGE GENERATING METHOD

CROSS-REFERENCE TO RELATED APPLICATION

This application claims priority under 35 U.S.C. § 119 to Korean Patent Application No. 10-2016-0022026 filed on Feb. 24, 2016, in the Korean Intellectual Property Office, the entire contents of which are incorporated herein by reference.

BACKGROUND

1. Field

One or more embodiments of the present invention relate to an image displaying apparatus, an image generating apparatus, an image providing server, an image displaying method, an image generating method, and a computer program.

2. Description of the Related Art

This section provides background information related to the present disclosure which is not necessarily prior art.

With the popularization of electronic apparatuses, such as desktop computers and smart phones, users acquire the capability to access various types of digital content through their electronic apparatuses. Accordingly, the users are able to view digital images, such as digital photos, digital drawings, or digital cartoons, by using such electronic apparatuses.

Here, a high quality experience of viewing digital images may be provided to the users when a method of providing the digital images is determined in consideration of intentions of a person who created the digital images, desires of a person who is viewing the digital images, or characteristics of an electronic apparatus displaying the digital images.

Information disclosed in this Background section was already known to the inventors before achieving the present disclosure or is technical information acquired in the process of achieving the present disclosure. Therefore, it may contain information that does not form the prior art that is already known to the public in this country.

SUMMARY

This section provides a general summary of the disclosure, and is not a comprehensive disclosure of its full scope or all of its features.

One or more embodiments include an image displaying apparatus, an image displaying method, and a computer program, whereby a plurality of digital images may be sequentially displayed based on information about an elapsed time from when a digital image displayed first is displayed or about a scroll degree.

One or more embodiments include an image displaying apparatus, an image displaying method, and a computer program, whereby a plurality of digital images may be sequentially displayed based on any one of an elapsed time from when a digital image displayed first is displayed and a scroll degree, in consideration of desires of a viewer viewing a digital image, an intention of a person who created a digital image, and characteristics of an electronic apparatus displaying a digital image.

One or more embodiments include an image generating apparatus, an image generating method, and a computer program, whereby an image group, in which a plurality of digital images may be sequentially displayed based on any one of an elapsed time from when a digital image displayed first is displayed and a scroll degree, may be created while creating the image group by using the plurality of digital images.

One or more embodiments include an image providing server whereby an image group, in which an image changing method is determined in consideration of characteristics of the image group including a plurality of digital images or characteristics of an electronic apparatus displaying a digital image, may be provided.

Additional aspects will be set forth in part in the description which follows and, in part, will be apparent from the description, or may be learned by practice of the presented embodiments.

According to one or more embodiments, an image displaying apparatus includes: a receiver configured to receive a first image group including an initial image and a final image; a display configured to display, on an image display window, one of a plurality of images included in the first image group; and a controller configured to control the display to display, on the image display window, the initial image, and control the display to change an image displayed on the image display window from the initial image to the final image, based on at least one of a degree to which the image display window is scrolled on the display and an elapsed time from when the initial image is displayed on the image display window.

According to one or more embodiments, an image generating apparatus includes: an input unit configured to receive an initial image and a final image, and receive an image changing method; and a generator configured to generate a first image group in which an image displayed on a display of an image displaying apparatus is changed from the initial image to the final image, based on at least one of a degree to which the initial image is scrolled on the display and an elapsed time from when the initial image is displayed on the display, according to the image changing method.

According to one or more embodiments, an image providing server includes: a communication unit configured to receive a first image group including an initial image and a final image, and transmit the first image group or a first modified image group; a selector configured to select an image changing method of the first image group, based on a characteristic of the first image group or a characteristic of an image displaying apparatus for displaying the first image group; and a generator configured to generate the first modified image group in which an image displayed on a display of the image displaying apparatus is changed from the initial image to the final image, based on at least one of a degree to which the initial image is scrolled on the display and an elapsed time from when the initial image is displayed on the display, according to the image changing method.

BRIEF DESCRIPTION OF THE DRAWINGS

Example embodiments will be described in more detail with regard to the figures, wherein like reference numerals refer to like parts throughout the various figures unless otherwise specified, and wherein.

Figure 1:
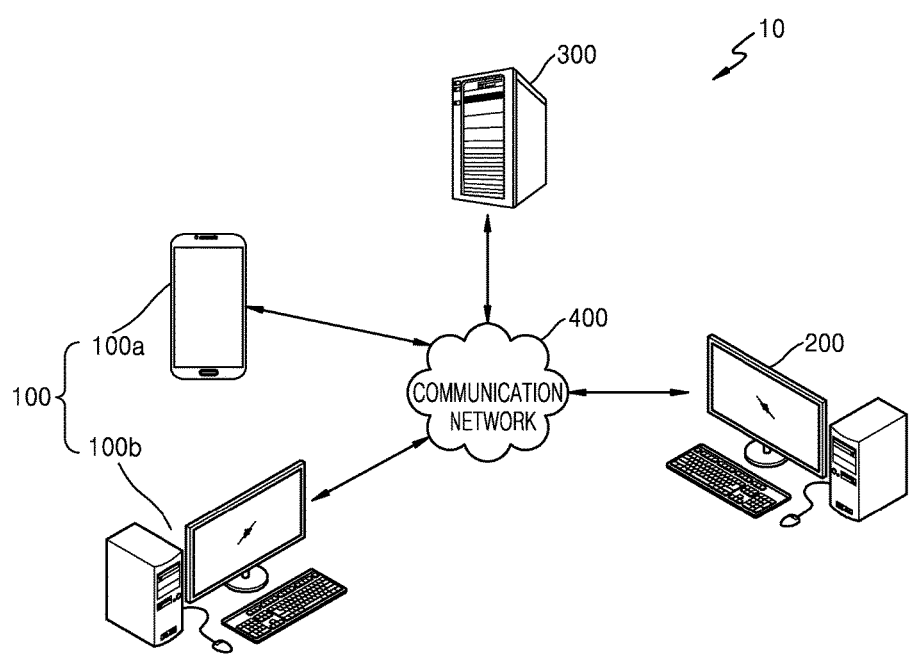
FIG. 1 is a diagram of an image displaying system according to an embodiment.

It should be noted that these figures are intended to illustrate the general characteristics of methods and/or structure utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by the example embodiments.

DETAILED DESCRIPTION

One or more example embodiments will be described in detail with reference to the accompanying drawings. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

Although the terms "first," "second," "third," etc., may be used herein to describe various elements, components, regions, layers, and/or sections, these elements, components, regions, layers, and/or sections, should not be limited by these terms. These terms are only used to distinguish one element, component, region, layer, or section, from another region, layer, or section. Thus, a first element, component, region, layer, or section, discussed below may be termed a second element, component, region, layer, or section, without departing from the scope of this disclosure.

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed items. Expressions such as "at least one of," when preceding a list of elements, modify the entire list of elements and do not modify the individual elements of the list. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element, there are no intervening elements present.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Units and/or devices according to one or more example embodiments may be implemented using hardware, software, and/or a combination thereof. For example, hardware devices may be implemented using processing circuitry such as, but not limited to, a processor, a central processing unit (CPU), a controller, an arithmetic logic unit (ALU), a digital signal processor, a microcomputer, a field programmable gate array (FPGA), a system-on-chip (SoC), a programmable logic unit, a microprocessor, or any other device capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, a CPU, a controller, an ALU, a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording media, including tangible or non-transitory computer-readable storage media discussed herein.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such a separate computer readable storage medium may include a universal serial bus (USB) flash drive, a memory stick, a Blu-ray/DVD/CD-ROM drive, a memory card, and/or other similar computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other similar medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and generate data in response to execution of the software. For simplicity, one or more example embodiments may be exemplified as one computer processing device; however, one of ordinary skill in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

FIG. 1 is a diagram of an image displaying system 10 according to an embodiment.

Referring to FIG. 1, the image displaying system 10 includes an image displaying apparatus 100, an image generating apparatus 200, and an image providing server 300.

The image displaying system 10 may be a system including electronic apparatuses required for a user of the image displaying apparatus 100 to view an image. Accordingly, the image displaying system 10 includes the image displaying apparatus 100. Also, the image displaying apparatus 10 includes the image providing server 300 providing image data to be displayed on the image displaying apparatus 100. Also, the image displaying system 10 includes the image generating apparatus 200 that creates an image.

The image displaying apparatus 100 may be an electronic apparatus displaying a digital image for the user to view the digital image. The image displaying apparatus 100 may be an electronic apparatus for storing and displaying a digital image generated by the image displaying apparatus 100 or a digital image generated from an electronic signal received from an external source.

A digital image herein may be an image displayable by using a visual sign in an electronic apparatus using a digital signal. Here, a visual sign may be an object that is visually recognizable and is capable of transmitting information in a visual form to another party, or a group of the objects, wherein examples of the object include an alphabet, a drawing, a photo, and a hologram. Examples of the visual signal may include an image, a sentence, and an emoticon, which may be generated by using alphabetical letters, a drawing, a photo, a hologram, or a combination thereof displayable on the image displaying apparatus 100, but are not limited thereto. Hereinafter, a digital image may be simply referred to as an image.

Also, an image group herein may denote data including two or more images. Also, the image group may be data included in cartoon data including one or more image groups. The cartoon data may be data shown through a display of the image displaying apparatus 100 in units of image groups. For example, one piece of cartoon data may be data including one or more image groups. Here, a display order and/or a display location of each of the one or more image groups may already be determined. For example, first cartoon data may include 20 image groups, and the 20 image groups may be data in which an order of displaying the 20 image groups are determined. When the first cartoon data is displayed on the display of the image displaying apparatus 100, an image group to be displayed first may be displayed first or on the top. Then, an image group to be displayed second through an image group to be displayed twentieth may sequentially be displayed. Here, different image groups may be displayed on the display according to a lapse of time or according to scrolling of the user.

One image group may be data including images to be displayed on an image display window occupying at least a part of the display of the image displaying apparatus 100. Also, image groups may be respectively displayed on image display windows at spatially different locations. Alternatively, image groups may be sequentially displayed on one image display window based on a uniform lapse of time or a point of time when a certain input is received from the user. For example, when the first cartoon data is displayed on the display of the image displaying apparatus 100, images of the image group to be displayed first may be displayed on a first image display window located at the top of the display of the image displaying apparatus 100. Then, images of the image group to be displayed second may be displayed on a second image display window located below the first image display window or spaced apart from the first image display window in one direction by a certain distance. As another example, when the first cartoon data is displayed on the display of the image displaying apparatus 100, the images of the image group to be displayed first may be displayed on an image display window for a certain period of time or until when an input, such as a click, is received from the user of the image displaying apparatus 100. Then, when a certain condition is satisfied, the images of the image group to be displayed second may be displayed on the image display window.

Images included in one image group may be sequentially displayed on an image display window according to a certain condition. The certain condition for sequentially displaying the images will be described below with reference to FIGS. 2 through 11C.

The image displaying apparatus 100 may be one of various types of electronic apparatuses for visually displaying an image. Examples of the image displaying apparatus 100 may include a smart phone, a laptop, a tablet personal computer (PC), a smart TV, a mobile phone, a personal digital assistant (PDA), a desktop computer, a media player, a micro-server, a global positioning system (GPS) device, an electronic book terminal, a digital broadcasting terminal, a navigation device, a kiosk, an MP3 player, a digital camera, a wearable device, and other mobile or non-mobile computing devices, but are not limited thereto. Alternatively, the image displaying apparatus 100 may be any one of various apparatuses capable of displaying an image, such as an electronic board and a touch table. Alternatively, the image displaying apparatus 100 may be an accessory having an image displaying function, such as a watch, glasses, a head-mounted electronic device, or a ring, but is not limited thereto.

Such an image displaying apparatus 100 may be an electronic apparatus capable of transmitting and receiving data related to an image to and from the image generating apparatus 200 and/or the image providing server 300 via wired/wireless communication.

The image generating apparatus 200 may be an electronic apparatus generating an image to be displayed on the image displaying apparatus 100. The image generating apparatus 200 may be an electronic apparatus enabling a user of the image generating apparatus 200 to generate an image by using software, such as an application, and hardware, such as a drawing pen. Alternatively, the image generating apparatus 200 may be a camera for photographing. Alternatively, the image generating apparatus 200 may be an electronic apparatus for receiving data for generating an image or an image group through communication with an external electronic apparatus.

The image generating apparatus 200 may be an electronic apparatus for transmitting and receiving data related to an image to and from the image displaying apparatus 100 and/or the image providing server 300 through wired/wireless communication.

Here, the image displaying apparatus 100 and the image generating apparatus 200 may be electronic apparatuses clearly distinguishable from each other or may be the same type of electronic apparatus determined based on a relative relationship of users. In other words, like the image displaying apparatus 100, examples of the image generating apparatus 200 may include a smart phone, a laptop, a tablet PC, a smart TV, a mobile phone, an PDA, a desktop computer, a media player, a micro-server, a GPS device, an electronic book terminal, a digital broadcasting terminal, a navigation device, a kiosk, an MP3 player, a digital camera, a wearable device, and other mobile or non-mobile computing devices, but are not limited thereto.

The image providing server 300 may be an electronic apparatus for transmitting and receiving data related to an image to and from the image displaying apparatus 100 and/or the image generating apparatus 200 through wired/wireless communication on the image displaying system 10.

The image providing server 300 may provide, in addition to data related to a digital image, a general search service and various services accommodating user convenience. In other words, in addition to a service of providing data related to a digital image, the image providing server 300 may provide various services, such as a search service, an email service, a social network service (SNS), a news service, a shopping information providing service, etc.

Alternatively, the image providing server 300 may be connected to a server providing a portal service including search, email, news, and shopping services, and may provide a webpage provided by the portal service to the image displaying apparatus 100 requesting information from the portal service. Here, the image providing server 300 and the portal server may be physically separated individual servers or may be one server that are only conceptually distinguished.

The image displaying system 10 may further include a communication network 400. The communication network 400 may provide a wired/wireless communication path between the image displaying apparatus 100, the image generating apparatus 200, and/or the image providing server 300. Also, the communication network 400 may perform a function of connecting a plurality of the image displaying apparatuses 100. Examples of the communication network 400 include wired networks, such as a local area network (LAN), a wide area network (WAN), a metropolitan area network (MAN), and an integrated service digital network (ISDN), and wireless networks, such as a wireless LAN, a CDMA, Bluetooth, and satellite communication, but are not limited thereto.

Figure 2:
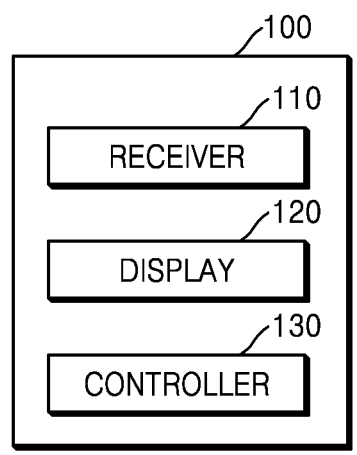
FIG. 2 is a block diagram of an image displaying apparatus according to an embodiment.

FIG. 2 is a block diagram of the image displaying apparatus 100 according to an embodiment.

Referring to FIG. 2, the image displaying apparatus 100 includes various units including a receiver 110, a display 120, and a controller 130.

The receiver 110 may receive a first image group including an initial image and a final image. Here, the receiver 110 may receive the first image group through wired/wireless communication from the image generating apparatus 200 or the image providing server 300, or may receive the first image group through an external electronic apparatus connected to the image displaying apparatus 100 through wired/wireless communication. Also, the receiver 110 may receive cartoon data including the first image group.

The first image group may be created by including a function in which any one of the initial image and the final image is displayed based on a degree to which they are scrolled on the display 120 and/or an elapsed time from when an initial image is displayed on the display 120. Here, the first image group may be created by the image generating apparatus 200 or the image providing server 300.

The receiver 110 may be a communication device or a component capable of performing communication, which transmits and receives data related to an image to and from the image generating apparatus 200 and/or the image providing server 300 through wired/wireless communication. In this case, examples of the receiver 110 capable of performing communication may include a Bluetooth communication unit, a Bluetooth low energy (BLE) communication unit, a near field communication unit, a WLAN (Wi-Fi) communication unit, a Zigbee communication unit, an infrared data association (IrDA) communication unit, a Wi-Fi direct (WFD) communication unit, an ultra wideband (UWB) communication unit, and an Ant+ communication unit, but are not limited thereto.

Alternatively, the receiver 110 may be an input device or a component capable of receiving an input, which receives various signals from the user of the image displaying apparatus 100. In this case, the receiver 110 capable of receiving an input may receive, from the user of the image displaying apparatus 110, a voice input, an alphabet input, a button pressing input, or a touch input.

The display 120 may display one of images included in the first image group. The display 120 may display, on an image display window occupying at least a part of the display 120, one of the images included in the first image group. Here, the display 120 may move the image display window in a scroll direction or in a direction opposite to the scroll direction, according to a scroll operation of the user. The display 120 may only display a part of the image display window or may make the image display window disappear.

The display 120 may display the initial image of the first image group as an image to be displayed first on the image display window. Then, the display 120 may display any one of intermediate images and the final image according to a control signal of the controller 130. Alternatively, the display 120 may display an image obtained by combining at least two of the initial image, the intermediate images, and the final image. For example, when an image displayed on the display 120 is changed from the initial image to a first intermediate image, the image may be changed by the initial image fading out (i.e., disappearing using a fade-out method) while the first intermediate image fades in (i.e., appears using a fade-in method). As a result, the display 120 may simultaneously display the initial image that is disappearing by using the fade-out method and the first intermediate image that is appearing by using the fade-in method. Also, the display 120 may set the initial image from among the images included in the first image group displayed on the image display window.

The display 120 may include at least one of a liquid crystal display (LCD), a thin-film transistor-liquid crystal display (TFT-LCD), an organic light-emitting diode (OLED), a flexible display, a 3-dimensional (3D) display, and an electrophoretic display, but is not limited thereto. Also, the image displaying apparatus 100 may include two or more displays 120 based on a structure of the image displaying apparatus 100.

The controller 130 generally controls overall operations of the image displaying apparatus 100. For example, the controller 130 may control the receiver 110 to receive an image, control the display 120 to display an image, or select an image to be displayed.

The controller 130 may include any type of apparatus for processing data, such as a processor. Here, the processor may be a hardware-embedded data processing apparatus having a physically structured circuit to perform a function expressed in a code or command included in a program. Examples of the hardware-embedded data processing apparatus may include processing apparatuses, such as a microprocessor, a central processing unit (CPU), a processor core, a multiprocessor, an application specific integrated circuit (ASIC), and a field programmable gate array (FPGA), but are not limited thereto.

The controller 130 may control the display 120 to display the initial image on the image display window of the display 120.

Here, selectively, the controller 130 may control the display 120 to change an image displayed on the image display window from the initial image to the final image, based on a degree to which the image display window is scrolled on the display 120. For example, the controller 130 may control the display 120 to display the initial image on the image display window until at least a part of the image display window reaches the center of the display 120, and then display the final image on the image display window after the entire image display window reaches the center of the display 120.

At this time, the first image group may include, in addition to the initial image and the final image, at least one intermediate image showing a changing process from the initial image to the final image. Such a first image group may be created by including a function in which any one of the initial image, the final image, and the at least one intermediate image is displayed based on a degree to which they are scrolled on the display 120 and/or an elapsed time from when the initial image is displayed on the display 120. The first image group may be created by the image generating apparatus 200 or the image providing server 300. In this case, the controller 130 may control the display 120 to sequentially display from the initial image to the final image through the at least one intermediate image, based on a degree to which the image display window is scrolled on the display 120. For example, the controller 130 may trisect the display 120 in a horizontal direction, and define a bottom portion as a first portion and a top portion as a second portion. Here, the controller 130 may control the display 120 such that the initial image is displayed on the image display window until at least a part of the image display window reaches the first portion of the display 120, the at least one intermediate image is sequentially displayed on the image display window while the image display window passes from the first portion to the second portion, and the final image is displayed on the image display window after the image display window has passed the second portion. As another example, the controller 130 may control the display 120 to display any one of the initial image, the at least one intermediate image, and the final image on the image display window in proportion to a movement distance from an initial location where an overall view of the image display window is displayed on the display 120 to a moved location caused by scrolling. In other words, the controller 130 may control the display 120 such that the initial image is displayed on the image display window from when the image display window is partially displayed on the display 120 until the entire image display window is displayed in the display 120, the at least one intermediate image is sequentially displayed from when the entire image display window is displayed in the display 120 to when the image display window is scrolled to a certain location, and then the final image is displayed.

Selectively, the controller 130 may control the display 120 such that the image displayed on the image display window is changed from the initial image to the final image based on an elapsed time from when the initial image is displayed on the image display window. For example, the controller 130 may control the display 120 to display the final image on the image display window 3 seconds after the initial image is displayed on the image display window.

The first image group may include, in addition to the initial image and the final image, at least one intermediate image showing a changing process from the initial image to the final image. Such a first image group may be created by including a function in which any one of the initial image, the final image, and the at least one intermediate image is displayed based on a degree to which they are scrolled on the display 120 and/or an elapsed time from when the initial image is displayed on the display 120. The first image group may be created by the image generating apparatus 200 or the image providing server 300. In this case, the controller 130 may control the display 120 to sequentially display from the initial image to the final image through the at least one intermediate image, based on the elapsed time from when the initial image is displayed on the image display window. For example, the controller 130 may control the display 120 to display a first intermediate image 3 second after the initial image is displayed on the image display window. Then, the controller 130 may control the display 120 to display a second intermediate image on the image display window 3.5 seconds after the initial image is displayed on the image display window or 0.5 seconds after the first intermediate image is displayed on the image display window. Similarly, the controller 130 may control the display 120 to display each of remaining intermediate images on the image display window for 0.5 seconds and lastly display the final image on the image display window.

Also, selectively, even when the images of the first image group are set to be sequentially displayed based on a degree to which they are scrolled, the controller 130 may control the display 120 such that the image displayed on the image display window is changed from the initial image to the final image based on the elapsed time from when the initial image is displayed on the image display window, in consideration of at least one of a request of the user of the image displaying apparatus 100, a characteristic, such as size or capacity, of the first image group, a characteristic, such as size, capacity, genre, or author, of the cartoon data including the first image group, and a performance of the image displaying apparatus 100. Also, selectively, even when the image displayed on the image display window is set to be changed based on the elapsed time from when the initial image is displayed, the controller 130 may control the display 120 such that the image displayed on the image display window is changed from the initial image to the final image based on the degree to which the image display window is scrolled on the display 120, in consideration of at least one of a request of the user of the image displaying apparatus 100, a characteristic, such as size or capacity, of the first image group, a characteristic, such as size, capacity, genre, or author, of the cartoon data including the first image group, and a performance of the image displaying apparatus 100.

Figure 3:
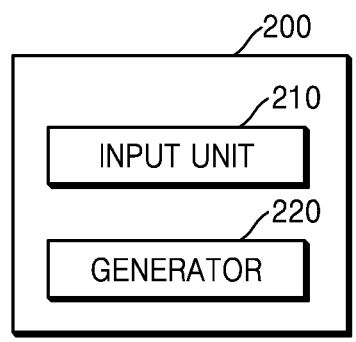
FIG. 3 is a block diagram of an image generating apparatus according to an embodiment.

FIG. 3 is a block diagram of the image generating apparatus 200 according to an embodiment.

Referring to FIG. 3, the image generating apparatus 200 includes an input unit 210 and a generator or generator unit 220.

The input unit 210 may receive information about an image from the user of the image generating apparatus 200 or an external electronic apparatus. In other words, the input unit 210 of the image generating apparatus 200 may receive an image included in carton data or image group provided to the image displaying apparatus 100. For example, the input unit 210 may be a drawing pen creating an image, a drawing board for receiving an image creating operation by a drawing pen, a mouse, or any other device or component for expressing an image according to an operation of creating an image. Alternatively, the input unit 210 may be a photographing device for obtaining an image through a photographing operation.

The input unit 210 may receive each of the initial image and the final image included in the first image group. Also, the input unit 210 may receive the at least one intermediate image showing the changing process from the initial image to the final image.

The input unit 210 may receive an image changing method from the user generating an image by using the image generating apparatus 200. In other words, the user, such as an author, who generates an image, may generate cartoon data by determining how the cartoon data is going to be represented. For example, the user of the image generating apparatus 200 may generate cartoon data such that images included in each image group included in the cartoon data are changed based on a degree to which the image display window is scrolled.

The generator 220 may generate the first image group by using the initial image and the final image received through the input unit 210. Here, the generator 220 may generate the first image group such that any one of the initial image and the final image is displayed based on at least one of a degree to which they are scrolled on the display 120 of the image displaying apparatus 100 and/or an elapsed time from when the initial image is displayed on the display 120 of the image displaying apparatus 100. Here, the generator 220 may generate the first image group such that an image is displayed by using a method corresponding to the image changing method received through the input unit 210, from among the degree to which they are scrolled on the display 120 of the image displaying apparatus 100 and/or the elapsed time from when the initial image is displayed on the display 120 of the image displaying apparatus 100.

Selectively, when at least one intermediate image showing a changing process from the initial image to the final image is input to the input unit 210, the generator 220 may generate the first image group such that the final image is displayed from the initial image, sequentially through the at least one intermediate image.

Here, selectively, the generator 220 may generate the first image group such that any one of the initial image, the at least one intermediate image, and the final image is displayed on the image display window of the image displaying apparatus 100, in proportion to a length from a location where an overall view of the initial image is displayed on the image display window of the image displaying apparatus 100 to a location where scrolling is performed. Also, selectively, the generator 220 may generate the first image group such that any one of the initial image, the at least one intermediate image, and the final image is displayed on the image display window of the image displaying apparatus 100, in proportion to an elapsed time from when a first time has passed after the initial image is displayed on the image display window.

Selectively, the image generating apparatus 200 may further include a controller (not shown) for controlling operations of the input unit 210, the generator 220, and other components.

Figure 4:
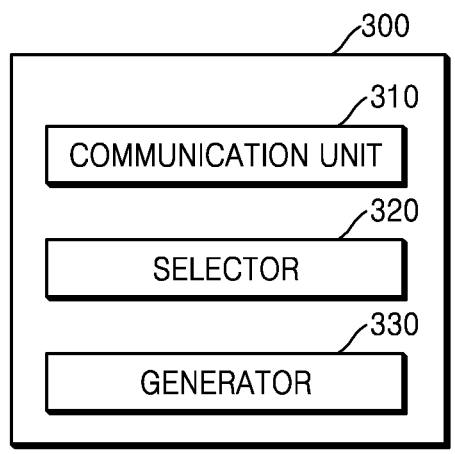
FIG. 4 is a block diagram of an image providing server according to an embodiment.

FIG. 4 is a block diagram of the image providing server 300 according to an embodiment.

Referring to FIG. 4, the image providing server 300 includes units including a communication unit 310, a selector 320, and a generator 330.

The communication unit 310 may be a component for performing wired/wireless communication with the image displaying apparatus 100 and the image generating apparatus 200. The communication unit 310 may receive the first image group from the image generating apparatus 200. Here, the first image group may include the initial image and the final image, and may further include the at least one intermediate image showing the changing process from the initial image to the final image.

The selector 320 may select an image changing method of the first image group in consideration of at least one of a command of the user of the image providing server 300, a request of the user of the image displaying apparatus 100, a request of the user of the image generating apparatus 200, a characteristic, such as size or capacity, of the first image group, a characteristic, such as size, capacity, genre, or author, of cartoon data including the first image group, and a characteristic, such as performance, of the image displaying apparatus 100. For example, the image generating apparatus 200 may have generated the first image group such that the images of the first image group are changed by using a first image changing method. When the image providing server 300 receives the first image group, the selector 320 may select the first image changing method as an image changing method of the first image group or may select a second image changing method to change images. Even when the image generating apparatus 200 did not select an image changing method of the first image group, the selector 320 may select an image changing method of the first image group.

The generator 330 may generate a first modified image group in which images are changed according to an image changing method selected by the selector 320. For example, images included in the first modified image group may have same content and display order as those included in the first image group. However, the first modified image group and the first image group may have different image changing methods.

In the current embodiment, the communication unit 310 may transmit the first image group received from the image generating apparatus 200 to the image displaying apparatus 100, transmit the first modified image group generated through the selector 320 and the generator 330 to the image displaying apparatus 100, or transmit the first image group and the first modified image group to the image displaying apparatus 100.

As described above with reference to FIGS. 2 through 4, the image displaying apparatus 100, the image generating apparatus 200, and the image providing server 300 included in the image displaying system 10 may perform at least some of various operations required to display an image by the image displaying apparatus 100. Also, the image displaying apparatus 100, the image generating apparatus 200, and the image providing server 300 may exchange signals including data related to operations via wired/wireless communication. Accordingly, the user of the image generating apparatus 200 may generate an image group and/or cartoon data to which a desired image changing method is applied. Also, the user of the image displaying apparatus 100 may view the image group and/or the cartoon data according to the intention of the user of the image generating apparatus 200 or according to the image changing method desired by the user of the image displaying apparatus 100.

Figure 5:
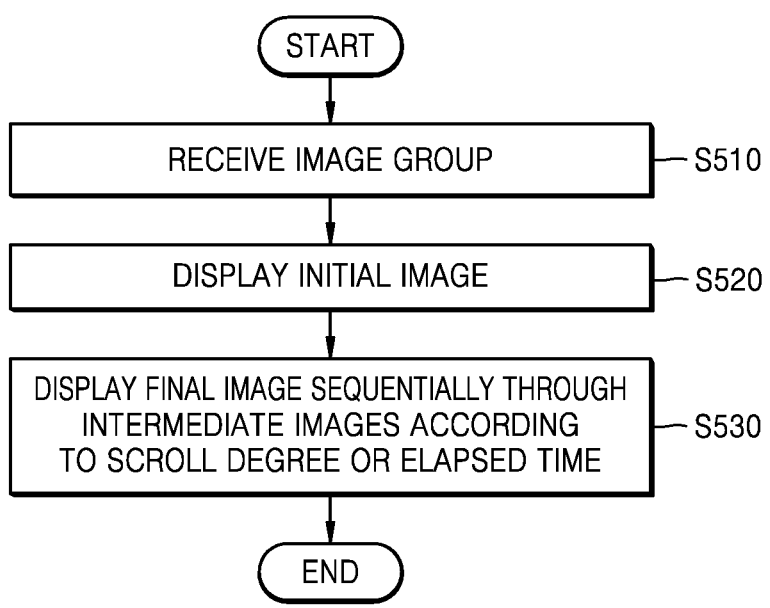
FIGS. 5 and 6 are flowcharts of an image displaying method according to embodiments.
Figure 6:
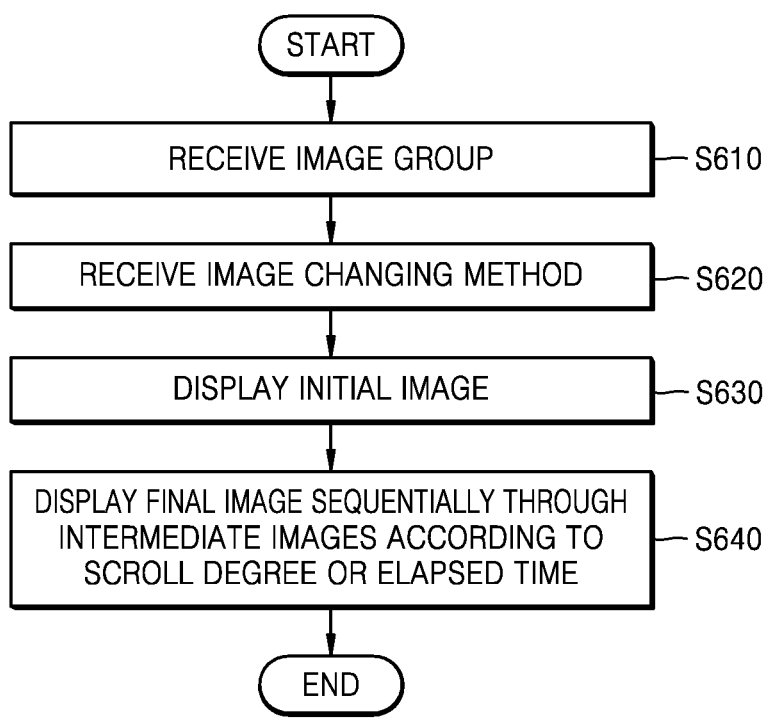

FIGS. 5 and 6 are flowcharts of an image displaying method according to embodiments. Hereinafter, details overlapping those of FIGS. 1 through 4 are not provided again.

Referring to FIG. 5, the image displaying apparatus 100 receives an image group, in operation S510. Here, the image group may be provided from the image generating apparatus 200 or the image providing server 300.

Then, the image displaying apparatus 100 displays an initial image, in operation S520. The initial image may be an image intended to be displayed first by an image creator from among images included in the image group.

Then, the image displaying apparatus 100 displays a final image sequentially through intermediate images according to a scroll degree or an elapsed time, in operation S530. Here, the final image may be an image intended to be displayed last by the image creator from among the images included in the image group, and the intermediate images may be images showing a changing process from the initial image to the final image.

Referring to FIG. 6, the image displaying apparatus 100 receives the image group in operation S610, and receives an image changing method in operation S620. Here, examples of the image changing method may include an image changing method based on a degree to which an image included in the image group is scrolled on a screen, and an image changing method based on an elapsed time from when an image included in the image group is displayed. The image changing method may be determined by the image generating apparatus 200 or by the image providing server 300.

The image displaying apparatus 100 displays the initial image in operation S630, and then displays the final image sequentially through the intermediate images according to a scroll degree or an elapsed time, in operation S640. Here, the image displaying apparatus 100 may change an image by using a method corresponding to the received image changing method, from among an image changing method based on the scroll degree and an image changing method based on the elapsed time.

In FIG. 6, operation S620 is performed after operation S610, but an embodiment is not limited thereto. In other words, operation S620 may be performed before operation S610 or operations S610 and S620 may be simultaneously performed.

Figure 7:
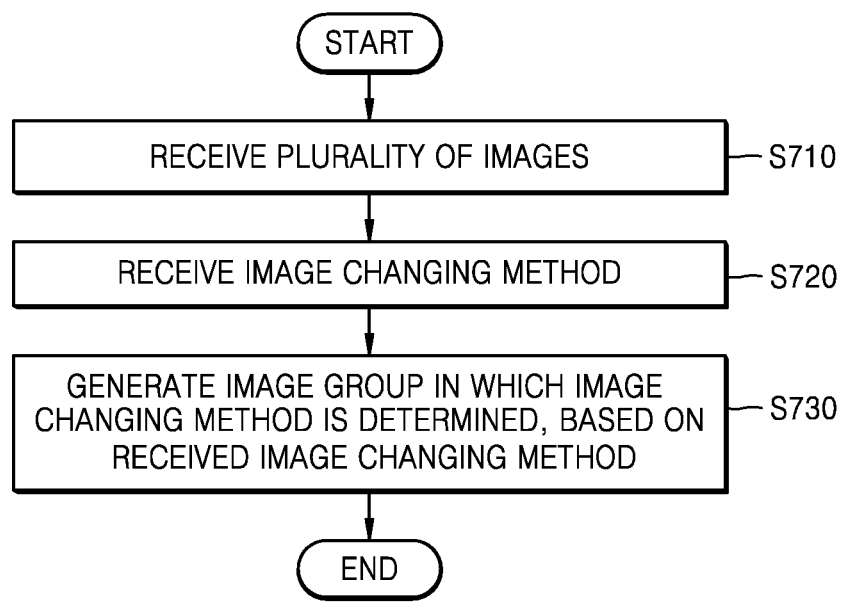
FIG. 7 is a flowchart of an image generating method according to an embodiment.

FIG. 7 is a flowchart of an image generating method according to an embodiment. Hereinafter, details overlapping those of FIGS. 1 through 4 will not be provided again.

Referring to FIG. 7, the image generating apparatus 200 receives a plurality of images, in operation S710. Here, the image generating apparatus 200 may receive the plurality of images directly from the user of the image generating apparatus 200 or through a communication apparatus from an external electronic apparatus. Alternatively, the image generating apparatus 200 may receive the plurality of images through an image capturing device included in the image generating apparatus 200.

Also, the image generating apparatus 200 may receive an image changing method in operation S720. Here, the image changing method may be selected by the user of the image generating apparatus 200 or received from an external electronic apparatus. Alternatively, the image generating apparatus 200 may use an image changing method automatically selected in consideration of at least one of a characteristic, such as size or capacity, of the images, a characteristic, such as size, capacity, a genre, or an author, of cartoon data including the images, and performance of the image displaying apparatus 100 for displaying the cartoon data.

Then, the image generating apparatus 200 may generate an image group in which the image changing method is determined, based on the received image changing method, in operation S730. The image generating apparatus 20 may generate one or more image groups including at least some of the plurality of images. Also, the image generating apparatus 200 may generate the cartoon data including the one or more image groups.

In FIG. 7, operation S720 is performed after operation S710, but an embodiment is not limited thereto. In other words, operation S720 may be performed before operation S710, or operations S710 and S720 may be simultaneously performed.

Figure 8:
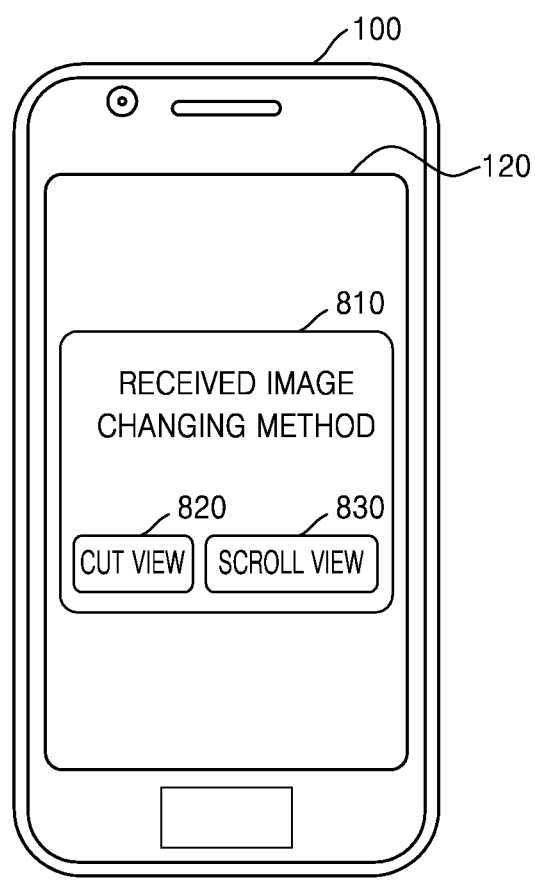
FIGS. 8 and 9 illustrate examples of selecting an image displaying method according to embodiments.
Figure 9:
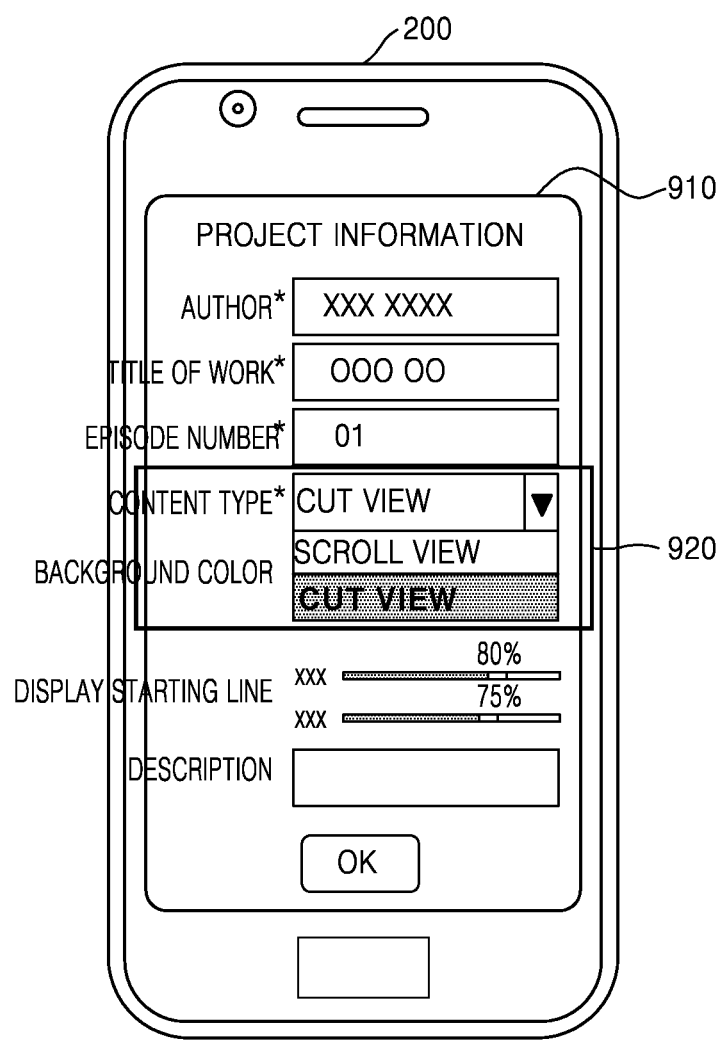

FIGS. 8 and 9 illustrate examples of selecting an image displaying method according to embodiments. Hereinafter, details overlapping those of FIGS. 1 through 4 are not provided again.

Referring to FIG. 8, the image displaying apparatus 100 may display, on the display 120, a user interface (UI) 810 for receiving an input of a user selecting an image displaying method. Here, the UI 810 for receiving an input of the user for selecting an image displaying method may display a UI 820 displaying a word 'cut view' indicating that images included in an image group are displayed according to a lapse of time, and a UI 830 displaying a word 'scroll view' indicating that images included in an image group are displayed according to a scroll degree. Here, the display 120 of the image displaying apparatus 100 may further include a touch sensor for receiving a touch input of the user, and may receive an input of the user touching any one of the UI 820 and the UI 830. Accordingly, the image displaying apparatus 100 may determine how the user of the image displaying apparatus 100 wants to display the image group or cartoon data.

Referring to FIG. 9, the image generating apparatus 200 may display a UI for receiving an image displaying method for displaying images of an image group to be generated, from the user of the image generating apparatus 200. For example, the image generating apparatus 200 may include a display 910 for displaying visual information, and an image generating UI displayed on the display 910 may include a UI 920 for determining an image displaying method of the images of the image group. The UI 920 may display words 'cut view' and 'scroll view'. Here, the user of the image generating apparatus 200 may select one of the words 'cut view' and 'scroll view' from the UI 920 to generate an image group or cartoon data that are displayed in a desired image displaying method.

FIGS. 10A through 11C illustrate examples of images being displayed according to an image displaying method. Hereinafter, details overlapping those of FIGS. 1 through 4 are not provided again.

Referring to FIGS. 10A through 10E, the image displaying apparatus 100 may display an image group displayed in a cut view method, i.e., images included in the image group are changed and displayed according to a lapse of time. For example, an image display window 1010 for displaying an image group may be displayed in the display 120 of the image displaying apparatus 100. Here, images included in a first image group may be displayed on the image display window 1010.

Figure 10A:
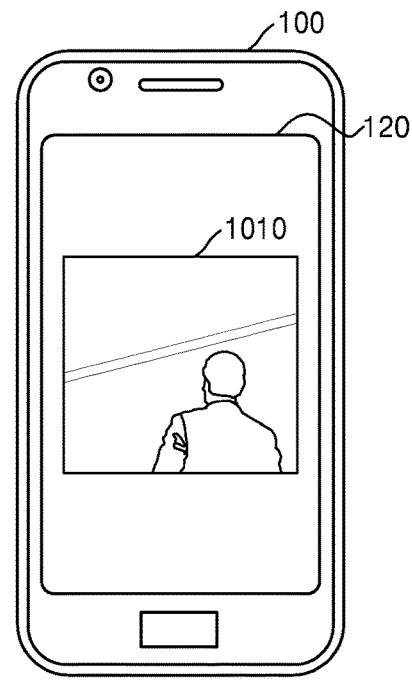
FIGS. 10A-10E and 11A-11C illustrate examples of images being displayed according to an image displaying method.

First, as shown in FIG. 10A, the image displaying apparatus 100 may display, on the image display window 1010, an image in which a person is looking at a soccer stadium. Here, the image displaying apparatus 100 may change the image by receiving an image changing request from the user. The image changing request may be an operation, such as a tap, long-tap, double-tap, or tap-and-swipe, performed with respect to a certain region of the display 120, but is not limited thereto. The image displaying apparatus 100 may determine, as the image changing request, at least one of various methods for receiving a signal from the user.

Figure 10B:
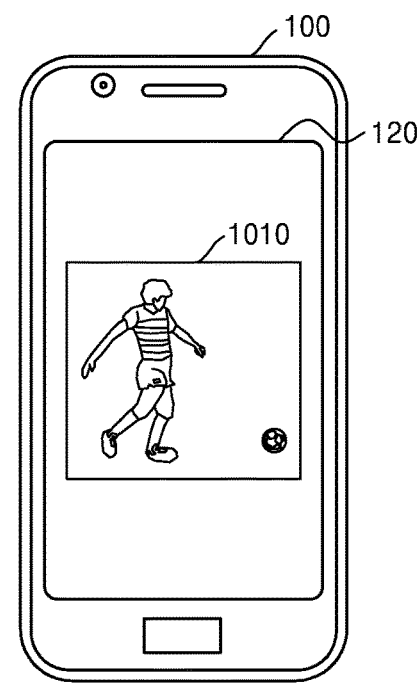

Then, as shown in FIG. 10B, upon receiving the image changing request, the image displaying apparatus 100 may change the image displayed on the image display window 1010 to an image in which a soccer player is running towards a soccer ball. Here, the image in which the soccer player is running towards the soccer ball may be an initial image to be displayed first from among the images included in the first image group.

Figure 10C:
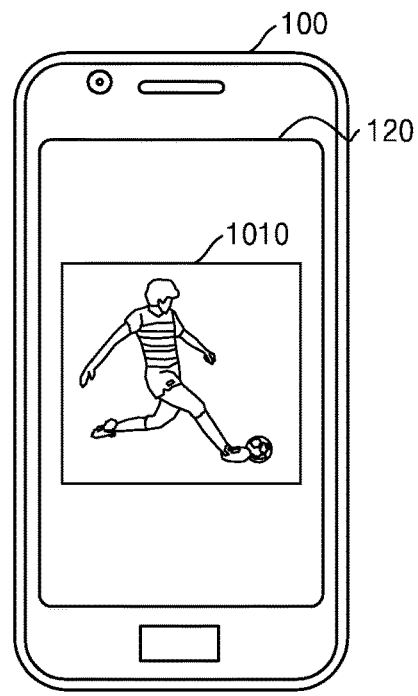

Then, as shown in FIG. 10C, the image displaying apparatus 100 may change the initial image displayed on the image display window 1010 to an image in which the soccer player is about to kick the soccer ball, when a first time has passed after a point of time when the initial image was displayed. Here, the image in which the soccer player is about to kick the soccer ball may be an intermediate image showing a changing process from the initial image to a final image. In FIGS. 10A through 10C, only one intermediate image is shown, but an intermediate image may include an image in which the soccer player is closer to the soccer ball compared to the initial image or an image in which the soccer player lifts his/her leg to kick the soccer ball.

Figure 10D:
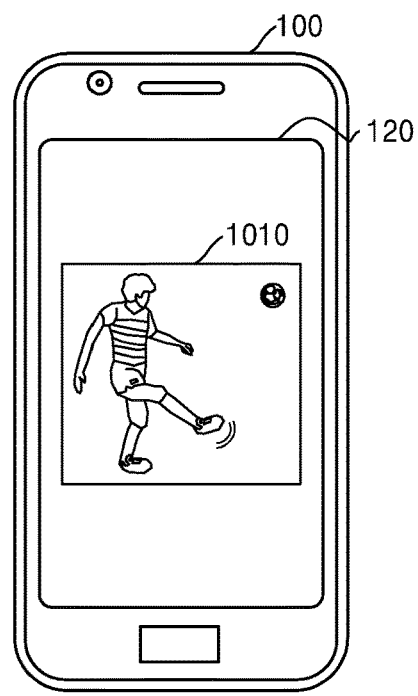

Then, as shown in FIG. 10D, the image displaying apparatus 100 may display, on the image display window 1010, an image in which the soccer ball is flying when a second time has passed after the point of time when the initial image was displayed. Here, the image in which the soccer ball is flying may be the final image. In other words, the image displaying apparatus 100 may sequentially display the initial image, i.e., the image in which the soccer player is running towards the soccer ball, intermediate images, i.e., the image in which the soccer player is closer to the soccer ball, the image in which the soccer player is lifting his/her leg to kick the soccer ball, and an image in which the soccer player has just kicked the soccer ball, and the final image, i.e., the image in which the soccer ball is flying.

When the final image that is to be displayed last from among the images included in the first image group is displayed on the image display window 1010 as shown in FIG. 10D, the image displaying apparatus 100 may stop changing of an image according to a lapse of time. Then, the image displaying apparatus 100 may change an image upon receiving an image change request from the user.

Figure 10E:
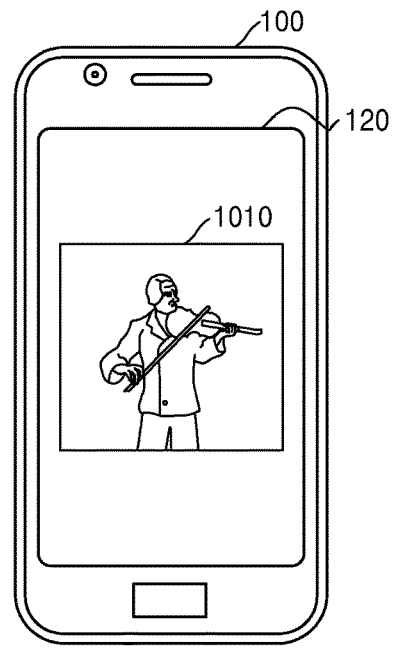

Then, as shown in FIG. 10E, the image displaying apparatus 100 may change an image displayed on the image display window 1010 to an image in which a person is playing a violin, upon receiving the image change request.

Figure 11A:
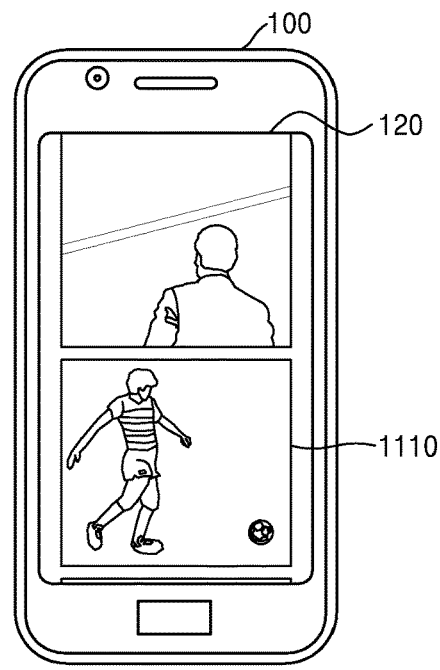
Figure 11B:
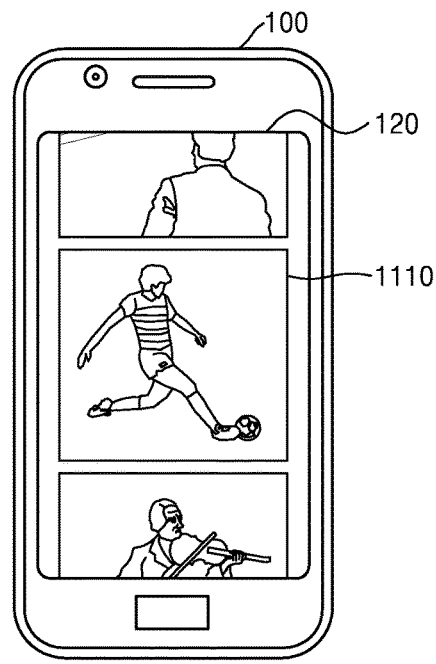
Figure 11C:
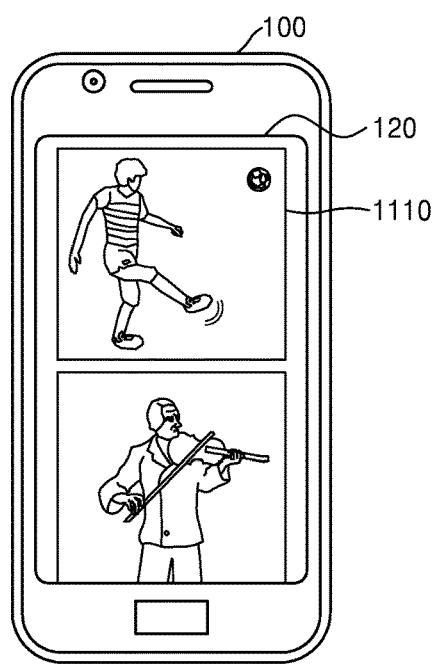

Referring to FIGS. 11A-11C, the image displaying apparatus 100 may display an image group in which images included in the image group are changed according to a scroll view method, i.e., a scroll degree. For example, the display 120 of the image displaying apparatus 100 may display an image display window 1110 for displaying an image group. Here, images included in a first image group may be displayed on the image display window 1110.

First, as shown in FIG. 11A, the image displaying apparatus 100 may display an image in which a soccer player is running towards a soccer ball when the image display window 1110 is scrolled relatively to the bottom of the display 120. Here, the image in which the soccer player is running towards the soccer ball may be an initial image to be displayed first from among the images included in the first image group.

Then, as shown in FIG. 11B, when the image display window 1110 is scrolled relatively to the middle of the display 120, the image displaying apparatus 100 may change the initial image to an image in which the soccer player is about to kick the soccer ball. Here, the image in which the soccer player is about to kick the soccer ball may be an intermediate image showing a changing process from the initial image to a final image. In FIGS. 11A through 11C, only one intermediate image is shown, but an intermediate image may include an image in which the soccer player is closer to the soccer ball compared to the initial image or an image in which the soccer player lifts his/her leg to kick the soccer ball.

Then, as shown in FIG. 11C, when the image display window 1110 is scrolled relatively to the top of the display 120, the image displaying apparatus 100 may display an image in which the soccer ball is flying, on the image display window 1110. Here, the image in which the soccer ball is flying may be the final image. In other words, the image displaying apparatus 100 may sequentially display the initial image, i.e., the image in which the soccer player is running towards the soccer ball, intermediate images, i.e., the image in which the soccer player is closer to the soccer ball, the image in which the soccer player is lifting his/her leg to kick the soccer ball, and an image in which the soccer player has just kicked the soccer ball, and the final image, i.e., the image in which the soccer ball is flying.

In other words, as shown in FIGS. 10A-10E and 11A-11C, the image displaying apparatus 100 may display images while changing the images based on any one of an elapsed time and a scroll degree. Here, the image changing method may be determined by the image displaying apparatus 100, by the image generating apparatus 200, or by the image providing server 300.

According to one or more embodiments described above, a plurality of digital images may be sequentially displayed according to any one of a scroll degree and a time elapsed after a digital image that is displayed first is displayed, in consideration of the desire of a viewer who is viewing the digital images, the intention of a person who created the digital images, and the characteristic of an electronic apparatus displaying the digital images. Also, when an image group is created by using a plurality of digital images, the image group, in which the plurality of digital images are sequentially displayed according to any one of a scroll degree and a time elapsed after a digital image that is displayed first is displayed, may be created. Also, the image group, in which an image changing method is determined in consideration of the characteristic of the image group including the plurality of digital images or the characteristic of the electronic apparatus displaying the digital images, may be provided.

According to an image displaying apparatus, an image displaying method, and a computer program according to one or more embodiments, a plurality of digital images may be sequentially displayed based on an elapsed time after when a digital image displayed first is displayed or a scroll degree.

Also, a plurality of digital images may be sequentially displayed based on any one of an elapsed time from when a digital image displayed first is displayed and a scroll degree, in consideration of the desires of a viewer viewing a digital image, the intention of a person who created a digital image, and the characteristics of an electronic apparatus displaying a digital image.

Also, according to an image generating apparatus, an image generating method, and a computer program according to one or more embodiments, an image group, in which a plurality of digital images may be sequentially displayed based on any one of an elapsed time from when a digital image displayed first is displayed and a scroll degree, may be created while creating the image group by using the plurality of digital images.

Also, according to an image providing server according to an embodiment, an image group, in which an image changing method is determined in consideration of characteristics of the image group including a plurality of digital images or characteristics of an electronic apparatus displaying a digital image, may be provided.

The foregoing description has been provided for purposes of illustration and description. It is not intended to be exhaustive or to limit the disclosure. Individual elements or features of a particular example embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An image displaying apparatus comprising:
   a receiver configured to receive a first image group including a plurality of separate images, the plurality of separate images comprising an initial image and a final image;

a display configured to display, on an image display window, one of the plurality of separate images included in the first image group; and a controller configured to control the display to display on the image display window, the initial image, and control the display to change an image displayed on the image display window from the initial image to the final image, based on at least one of a degree to which the image display window is scrolled on the display and an elapsed time from when the initial image is displayed on the image display window, wherein an image changing method of the first image group is determined to be a first method or a second method according to a selection between the first method and the second method which is determined by a user input, and the controller is configured to control the display to move the image display window and change the image displayed on the display from the initial image to the final image, based on the degree to which the image display window is scrolled on the display, if the image changing method is determined to be the first method, and control the display to sequentially change the image displayed on the image display window from the initial image to the final image and remove the initial image from the image display window without scrolling the initial image, based on the elapsed time from when the initial image is displayed on the image display window, the image display window being in a fixed location in the display during said changing of the image, if the image changing method is determined to be the second method.

2. The image displaying apparatus of claim 1, wherein the plurality of separate images in the first image group further comprises at least one intermediate image showing a changing process from the initial image to the final image, and the controller is further configured to control the display to display, on the image display window, the final image sequentially through the at least one intermediate image, based on at least one of the degree to which the image display window is scrolled on the display and the elapsed time from when the initial image is displayed on the image display window.

3. The image displaying apparatus of claim 2, wherein the controller is further configured to control the display to display, on the image display window, any one of the initial image, the at least one intermediate image, and the final image in proportion to a movement distance from an initial location where an overall view of the image display window is displayed on the display to a moved location caused by scrolling, if the image changing method is determined to be the first method.

4. The image displaying apparatus of claim 2, wherein the controller is further configured to control the display to display, on the image display window, the initial image, the at least one intermediate image, and the final image in proportion to a passed time from when a first time has passed after the initial image is displayed on the image display window, and remove both the initial image and the at least one intermediate image from the image display window, if the image changing method is determined to be the second method.

5. The image displaying apparatus of claim 2, wherein the first image group is an image group created by an image generating apparatus or an image providing server such that any one of the initial image, the at least one intermediate image, and the final image is displayed on the image display window, based on at least one of the degree to which the image display window is scrolled on the display and the elapsed time from when the initial image is displayed on the image display window.

6. The image displaying apparatus of claim 5, wherein the controller is further configured to change the image changing method from the second method to the first method and control the display to sequentially display the plurality of separate images included in the first image group based on the elapsed time, according to a request of a user of the image displaying apparatus, even when the image changing method is predetermined to be the first method and the plurality of separate images included in the first image group are created to be sequentially displayed based on the degree to which the image display window is scrolled on the display.

7. The image displaying apparatus of claim 5, wherein the controller is further configured to change the image changing method from the second method to the first method and control the display to sequentially display the plurality of separate images included in the first image group based on the degree to which the image display window is scrolled on the display, according to a request of a user of the image displaying apparatus, even when the image changing method is predetermined to be the second method and the plurality of separate images included in the first image group are created to be sequentially displayed based on the elapsed time.

8. The image displaying apparatus of claim 1, wherein the receiver is further configured to receive the image changing method of the image group from a user of the image displaying apparatus.

9. The image displaying apparatus of claim 1, wherein the first image group is an image group included in cartoon data comprising at least one image group, and the receiver is further configured to receive the cartoon data.

10. The image displaying apparatus of claim 9, wherein the cartoon data is shown through the display in units of the at least one image group.

11. An image generating apparatus comprising:

an input unit configured to receive a plurality of separate images including an initial image and a final image, and receive an image changing method; and a generator configured to generate a first image group from the plurality of separate images in which an image displayed on a display of an image displaying apparatus is changed from the initial image displayed on a display window of the display to the final image, based on at least one of a degree to which the initial image is scrolled on the display and an elapsed time from when the initial image is displayed on the display, according to the image changing method, wherein the image changing method is determined to be a first method or a second method according to a selection between the first method and the second method which is determined by a user input, and the generator is configured to generate the first image group in which the image displayed on a display of an image displaying apparatus is changed from the initial image to the final image and move the display window, based on the degree to which the display window is scrolled on the display, if the image changing method is determined to be the first method, and generate the first image group in which the image displayed on a display of an image displaying apparatus is sequentially changed from the initial image to the final image and remove the initial image from the display window after the initial image is displayed in the display window, based on the elapsed time from when the initial image is displayed on the display window, the display window being in a fixed location in the display during said changing of the image, if the image changing method is determined to be the second method.

12. The image generating apparatus of claim 11, wherein the input unit is further configured to receive at least one separate intermediate image among the plurality of separate images, the intermediate image showing a changing process from the initial image to the final image, and the generator is further configured to generate the first image group in which the final image is displayed on the display sequentially through the at least one intermediate image from the initial image, based on at least one of the degree to which the initial image is scrolled on the display and the elapsed time from when the initial image is displayed on the display.

13. The image generating apparatus of claim 12, wherein the generator is further configured to generate the first image group in which any one of the initial image, the at least one intermediate image, and the final image is displayed on the display in proportion to a movement distance from an initial location where an overall view of the image display window is displayed on the display to a moved location caused by scrolling, if the image changing method is determined to be the first method.

14. The image generating apparatus of claim 12, wherein the generator is further configured to generate the first image group in which any one of the initial image, the at least one intermediate image, and the final image is displayed on the display in proportion to a passed time from when a first time has passed after the initial image is displayed on the image display window, and remove both the initial image and the at least one intermediate image from the display window, if the image changing method is determined to be the second method.

15. The image generating apparatus of claim 11, wherein the first image group is an image group included in cartoon data that comprises at least one image group and is shown through the display in units of the at least one image group, and the generator is further configured to generate the cartoon data.

16. An image providing server comprising:

a communication unit configured to receive a first image group including a plurality of separate images that comprises an initial image and a final image, and transmit the first image group or a first modified image group;

a selector configured to select an image changing method of the first image group to a first method or a second method according to a selection between the first method and the second method which is determined by a user input; and a generator configured to generate the first modified image group in which an image displayed on a display of an image displaying apparatus is changed from the initial image displayed on a display window of the display to the final image, based on at least one of a degree to which the initial image is scrolled on the display and an elapsed time from when the initial image is displayed on the display, according to the image changing method, wherein the image displayed on the display of the image displaying apparatus is changed from the initial image to the final image and the display window is moved based on the degree to which the initial image is scrolled on the display, if the image changing method is selected to the first method, and the image displayed on the display of the image displaying apparatus is sequentially changed from the initial image to the final image and the initial image is removed from the display window after the initial image is displayed in the display window based on the elapsed time from when the initial image is displayed on the display, the display window being in a fixed location in the display during said changing of the image, if the image changing method is selected to the second method.

* * * * *